Oct. 11, 1932.     O. U. ZERK     1,882,053
LUBRICATING MEANS AND METHOD
Filed Oct. 21, 1929
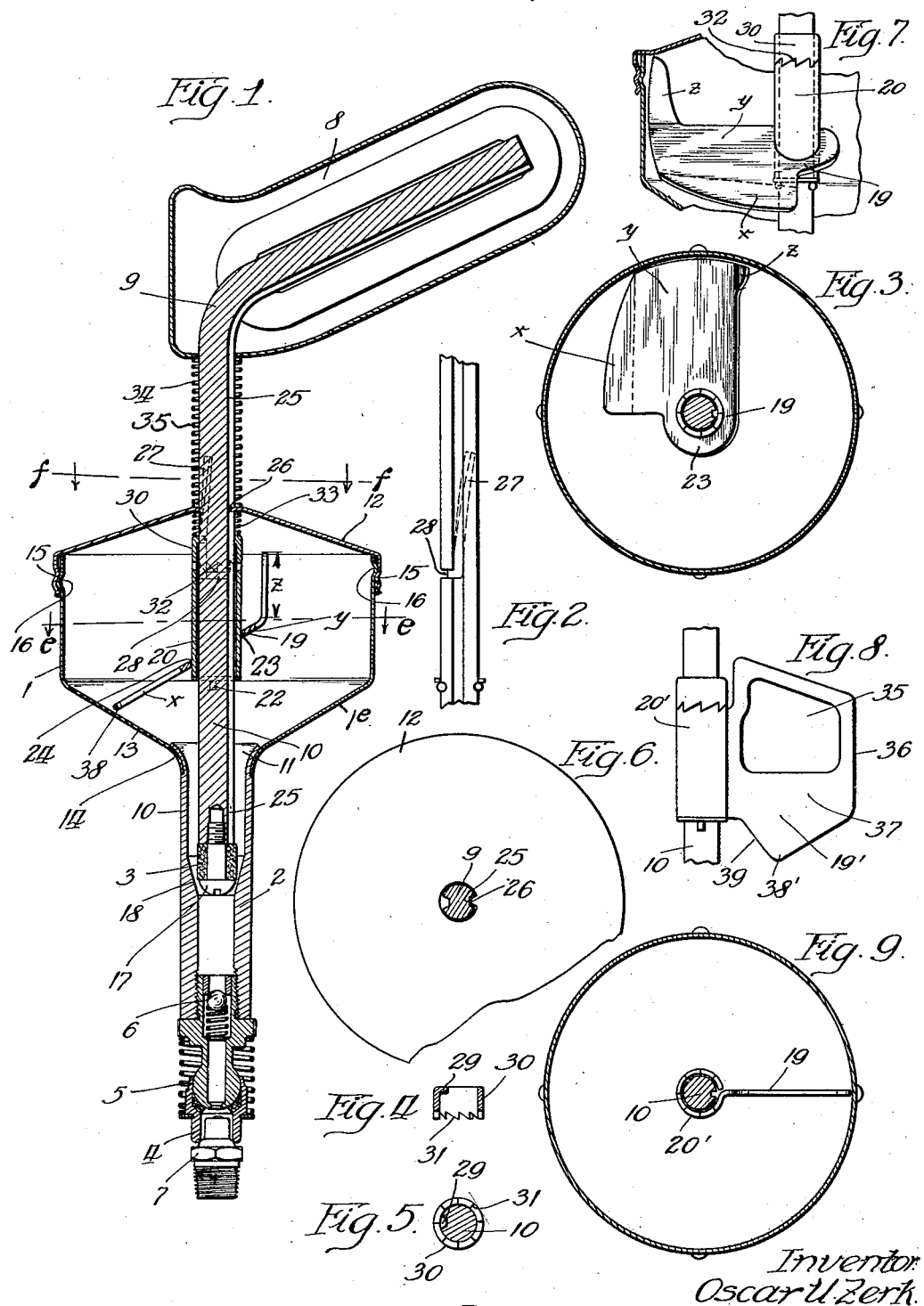
Inventor
Oscar U Zerk.
By Slough & Canfield
Attys Patented Oct. 11, 1932

1,882,053

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING MEANS AND METHOD

Application filed October 21, 1929. Serial No. 401,280.

My present invention relates to lubricating guns and more particularly to that class of lubricating guns commonly known in the trade as grease guns and oil guns, which are employed for the purpose of quickly and easily supplying a quantity of lubricant to bearing nipples of an automobile chassis or other mechanism requiring periodic lubrication.

The apparatus of my invention is equally well adapted for use in connection with the lubrication of vehicles, such as the chassis bearings of automobiles, tractors, gun carriages, war tanks, locomotives, airplanes, air ships, sea vessels, etc., or in connection with industrial lubrication, which includes the lubrication of stationary machines, such as stamping presses, printing presses, engines, textile machinery, shafting, and all the other numerous types of machines and machine tools of modern industry.

In grease gun lubrication two types of apparatus are commonly used: First, the interlocking type employing a coupling for the purpose of temporarily rigidly interlocking the lubricating gun nozzle and the lubricant receiving nipple, and second, the contact type where the lubricating gun nozzle and nipple are not temporarily rigidly interlocked, but simply pressed against each other and held in lubricant communicating contact by manual pressure during the lubricating period.

My present invention applies to both the interlocking and contact type of guns, although it is believed to have a more particular application to guns of the contact type. The dimension of the lubricant containing reservoir, or barrel, not only depends upon the quantity of lubricant which the barrel is required to hold, but also upon such other considerations as the necessity of operating the gun in connection with lubricant receiving nipples which are often located in position difficult of access, considerations involved in the guns, and in the packaging and sale of the same.

I also preferably provide the gun with a nipple engaging nozzle of such form that the lubricant barrel can be oscillated from alignment with the axis of the nipple to place it in such a position where it will not interfere with any adjacent part of the mechanism carrying the nipple; I, therefore, contemplate the use of the gun of my present invention in connection with a nozzle and nipple construction as is more particularly disclosed and claimed in my copending companion application for United States Letters Patent, Serial No. 396,352, filed September 30, 1929.

However, particularly in its broader aspects, my gun may be employed with other nozzle and nipple constructions, as will be apparent to those skilled in this art to which my invention appertains.

The lubricant containing barrel is made of large diameter relative to its length, being preferably of a diameter twice its length, thereby achieving important advantages. Such a barrel being relatively short and shallow is capable of being easily filled with grease with little entrapment of air bubbles, and has the additional advantage of being relatively inexpensive to manufacture, since a barrel of the shallow type shown, can be made in one drawing operation without annealing, while a deep elongated tubular barrel of the relatively small diameter employed in the older type of guns, requires six to ten drawing operations, with one to three interposed annealing operations. The use of a shallow barrel is advantageous in combination with my new type of grease impeller as fully explained herein.

When guns having contact nozzles, making pressure engagement with nipples of the contact type, have been used to dispense grease at high pressure, piston followers have commonly been employed in contact with the rear surface of the body of grease in the gun barrel to prevent air being drawn through the body of grease responsive to lubricant being forced from the forward end of the barrel by the action of a high pressure piston telescoping in a cylinder to supply lubricant to the engaged nipple.

Such piston followers have been commonly guided either by the lateral walls of the lubricant containing barrel, or by the piston rod extending reciprocably axially of the barrel, or by both, and are required to be removed when the barrel is recharged with lubricant, such removal being sometimes attended with difficulty due to the partial vacuum commonly created by the rearward movement of such follower.

Such followers are, moreover, objectionable since they can only exercise their intended function for such portion of the entire body of grease as may be contained in the portion of the cylinder comprising the barrel which is of uniform cross-sectional area; for instance, where conical ends are provided for the barrel a follower which fits the lateral walls of other portions thereof will not be able to fit into such conical end portions and, in such a case, often retards flow of grease therefrom rather than assisting in expressing such grease; grease will, therefore, be retained, which cannot be expelled prior to refilling of the barrel.

An object of my invention, therefore, is to provide a lubricant gun with a barrel for supplying grease to the higher pressure cylinder of the gun wherein lubricant will be continuously supplied to the high pressure cylinder until practically all of the grease is dispensed therefrom.

Another object of my invention is to provide a positive impeller mechanism for grease in the barrel to positively move it toward the high pressure cylinder of the gun.

Another object of my invention is to remove the adhesive contact between lateral portions of the grease in the barrel forming a lubricant reservoir, deflecting the lubricant towards the center of said barrel from whence it is fed into the high pressure cylinder of the gun.

Another object of my invention is to accomplish the aforesaid objects by providing a rotatable impeller which is so formed that it efficiently performs its intended functions without disturbing the body of grease immediately adjacent to the mouth of the passage leading to the pressure chamber of the gun.

Another object of my invention is to provide improved impeller means for grease adapted to effect a constantly operative impelling effort to move the grease toward a dispensing mechanism.

Another object of my invention is to provide an improved lubricant gun adapted to efficiently supply lubricant to nipples adapted for temporary engagement by a nozzle of the gun, at high pressure, and which provides for substantially continuous forward movement of the lubricant in a reservoir barrel of the gun to the high pressure lubricant compressing and dispensing cylinder thereof.

Another object of my invention is to provide an improved grease gun with improved means to prevent air being drawn through the body of grease to the lubricant dispensing high pressure chamber of the gun.

Other objects of my invention and the invention itself will become apparent to those skilled in the art to which my invention appertains from the following description of certain embodiments of my invention, and in which reference is had to the accompanying drawing illustrating the said embodiments.

In the drawing:

Fig. 1 is a longitudinal medial sectional view of a lubricant gun which is an embodiment of my invention;

Fig. 2 is a side elevational view of a fragment of a piston rod therefor;

Fig. 3 is a transverse sectional view thereof, taken on the line *e*—*e* of Fig. 1;

Fig. 4 is a longitudinal medial sectional view of a ratchet element therefor;

Fig. 5 is an end view of the ratchet element of Fig. 4 together with the rod of Fig. 2 shown in transverse section;

Fig. 6 is a transverse section taken on the line *f*—*f* of Fig. 1;

Fig. 7 is a side elevational view of an impeller, ratchet element therefor, and a fragment of the piston rod supporting the impeller and ratchet element;

Fig. 8 is a side elevational view of an impeller, ratchet element therefor, and a fragment of the piston rod supporting the impeller and ratchet element, adapted for use in a lubricating gun which is another embodiment of my invention, and Fig. 9 is a view similar to that of Fig. 3, but illustrating the placement of the impeller of Fig. 8 in a gun barrel such as that of Fig. 1.

Referring now, first, to Figs. 1 to 7, inclusive, of the drawing, in all of which like parts are designated by like reference characters, the gun is provided with a relatively short tubular container 1 herein referred to as the barrel or lubricant reservoir of the gun, and adapted to contain a supply of lubricant, for a high pressure cylinder 2 adapted to receive a piston 3 of relatively small diameter, reciprocable therein, to eject lubricant through a terminal nozzle 4, joined thereto through the lubricant conducting universal joint mechanism generally shown at 5, and through a check valve 6.

A nipple 7 is shown in Fig. 1 against which the nozzle 4 is adapted to be pressed by a manually effected pressure effort directed upon a gun handle 8 affixed to the posterior end 9 of the piston rod 10, which projects axially through the barrel 1 and supports at its end the piston 3 for projection into the pressure cylinder 2.

The apparatus described is adapted to coincidentally compress lubricant in the cylinder, make a pressure contact to establish a leakproof joint between the nozzle and nipple, and to express lubricant from the high pressure cylinder into the nipple for communication to a bearing to be lubricated.

The high pressure cylinder 2 is tubular in form with relatively thick and rigid lateral walls. Said cylinder is provided with an integral tubular inlet 10 of relatively increased bore and an outwardly flared mouth 11. The barrel 1 is in the form of a shallow cup having a centrally apertured cap 12 and a centrally apertured end wall 13 of progressively decreased diameter proceeding from the cylindrical portion of the barrel. The flared inlet mouth 11 is received within the central aperture of the end wall 13 and has its outer surfaces relieved, for receiving the reduced tubular portion 14 of the barrel, in engagement therewith. To make a leakproof joint the parts 14 and 11 are soldered together.

The cap 12 may be provided, as shown, with a concave convex end wall and a lateral tubular flange 15 extending therefrom and pressed to the form of screw threads for affixing the cap to the barrel by turning the screw threaded flange 15 over lateral projections 16 of the barrel wall.

The piston 3 is in the form of an annulus of a preferably compressible material, such as cork or the like, axially secured by a screw 17 onto the end of the piston rod 10. The screw 17 has a reduced threaded end and a relatively large shank providing a shoulder for engagement with the end of the rod, the shank being of such a length that the piston 3 may be moved laterally, a slight amount, when telescoped within the cylinder 2. The piston 3 will also be compressed when projected in the cylinder 2 due to the fact that it is normally of somewhat larger diameter than the bore of the cylinder. It is guided to its position within the bore by the inclined annular surface 18 interconnecting the compression chamber proper with the inlet passage leading thereto.

Within the barrel 1 forming the lubricant reservoir a sheet metal impeller, indicated generally at 19, is provided secured to a tubular supporting shaft 20 which is loosely telescoped over the piston rod 10 engaging by an end with lateral projections 22 of the rod to restrain it from longitudinal movement toward the end of the piston rod.

The impeller is generally inclined to a plane normal to the axis of its shaft and while it may be in the form a straight blade, the blade may have portions deflected in any well known manner, such as illustrated, wherein the blade comprises three integral portions extending longitudinally of the reservoir barrel 1, shown, respectively, at X, Y and Z. The portion X is inclined downwardly and outwardly from its supporting shaft 20 to closely approach the outer portion of the end wall 13 of the reservoir to sweep it to displace lubricant outwardly therefrom towards the unswept central portion of said end wall, including its central aperture containing the dispensing mouth 11 for the conduit 10 leading to the high pressure cylinder 2.

The portion Z of the blade is upright and is disposed closely contiguous to the inner cylindrical surface portion of the reservoir 1, which is disposed relatively remote from the end wall 13.

The intermediate portion Y of the blade sweeps, by its outer edge portion the portion of the cylindrical reservoir surface which is disposed intermediate the portion swept by the blade portion Z and the annular portion of the end wall 13 swept by the blade portion X. In other words, successive longitudinally disposed surfaces of the reservoir comprising the outer annular portion of the wall 13, the surface of the cylindrical portion of the reservoir adjacent thereto, and the balance of said reservoir cylindrical surface, disposed remotely to the wall 13, are coincidentally swept by the successive blade portions X, Y and Z.

The blade portion X and Y are disposed angularly to any plane passed through the axis of the rod 10, but the blade portion Z is preferably more nearly disposed parallel to one such plane.

The supporting portion 23, affixed to the tube 20, comprises a projection of the said intermediate blade portion Y.

The impeller blade 19 is projected mostly to one side of its supporting shaft 20 and is provided with an apertured reduced end 23, the aperture thereof being elongated, having a minor axis indicated in Fig. 3, and a major axis indicated by the length of the opening 24 of Fig. 1.

The rod 10 is longitudinally grooved at one side as shown at 25, this being preferably done from end to end during the preliminary operations in the making of the rod. The cap 12 is formed with an inward projection 26 extending into the groove 25 to prevent relative rotation of the rod 10 and the cap 12, while still permitting longitudinal reciprocation of the rod through the central aperture of the cap.

The opposite lateral surface of the rod 10 is also provided with a relatively short groove 27 in the form of a portion of a spiral; the spirally formed groove 27 communicates at its bottom end with a transverse arcuate groove 28 which communicates also with the longitudinal groove 25.

The intercommunicating groove 28 is provided for the purpose of assembling the impeller shaft 20 and ratchet annulus 30, onto the rod 10 prior to the forming of the supporting beads 22 on the rod and prior to the placement of the piston 3 thereon. Under such a condition the ratchet annulus 30 and tubular shaft 20 are successively telescoped over the free end of the rod 10 with the inward projection 29 of the annulus first guided to enter the longitudinal groove 25 and then when the shaft is sufficiently telescoped over the rod 10 by relative rotation of the rod and annulus the projection 29 is guided through the transverse groove 28 into the groove 27.

The beads 22 are then formed on the rod 10 to restrain the projection from reentering the transverse groove 28.

The annulus 30 is best illustrated in longitudinal medial section and in plan in Figs. 4 and 5, and comprises a short section of tube having the ratchet teeth 31 formed in its one end edge and having the inward projection 29 at its other end portion. The diameter of the tube forming the annulus is such that the annulus fits loosely over the rod 10, and also the projection fits loosely within the spiral groove 27.

Engaging with the ratchet teeth 31 are cooperating ratchet teeth 32 formed on the adjacent end edge of the shaft 20. A helical spring 35 surrounding the rod 10 is interposed between the cap 12 and the adjacent end of the annulus to keep the ratchet teeth 31 and 32 of the annulus and tubular impeller shaft, respectively, in engagement, said spring, however, yielding upon retractive rotative movements of the annulus occasioned by a receding movement of the spirally grooved piston rod 10. The operation of the gun as described will now be clear.

The space within the reservoir 1 and cylinder 2 being first filled with grease, the operator will reciprocate the rod 10 into the cylinder 2 which discharges grease from the cylinder 2, in a well known manner. Subsequent retraction of the piston from the cylinder will recharge the cylinder with grease from the reservoir, through the mouth 11 and conduit 10. At each subsequent reciprocation of the rod into the cylinder 2, the lateral walls of the spiral groove 27 will make a camming engagement with the projection 9 of the ratchet annulus and effect a rotative movement of the annulus, to a degree determined by the pitch and length of the groove.

The ratchet teeth of the annulus engaging, tractively with the similarly formed teeth of the impeller shaft will effect rotation of the impeller shaft to the same degree as that of the annulus.

In the embodiment illustrated I preferably rotate the impeller shaft relative to the piston rod 10 and the tubular reservoir 1, one-eighth of a complete rotation so that eight such operations will be sufficient to completely rotate the shaft 20 and the impeller blade 19 one entire revolution, and the blade 19 will then have swept the lubricant engaged by its forward face from all portions of the reservoir walls which are nearly engaged by the moving impeller.

The impeller rotatably moving about its axis with the edges of its inclined portions X and Y in contact with the body of grease ahead of it, will not only compact the grease but will cause it to move inwardly to a central position in intimate contact with the body of grease in the conduit 10.

At the same time, the body of grease engaged by such impeller portion and by the non-inclined impeller portion Z, will be contacted and moved inwardly in intimate contact with the portions of grease, above referred to. Some of the grease above the impeller will not be directly disturbed by the impeller but will follow the grease engaged by the impeller downwardly through the reservoir by the effect of cohesion between the different particles of grease.

The lateral edges of the blade perform the very important function of moving the grease from intimate contact with the lateral walls of the reservoir so that the fluid pressure exerted upon its outer surface, disposed remotely from the mouth 11 of the conduit 10, may readily press the body of grease into such conduit and the cylinder 2, responsive to the reduction in pressure within the cylinder and said conduit, consequent to the withdrawal of the piston 3 from said cylinder.

It is clear from the above that, in the embodiment illustrated, when the nozzle 4 is placed over a nipple 7, and a thrust effort exercised on the hand grip 8 towards the nipple, that the piston rod 10 moving into pressure cylinder 2 to effect high pressure discharge of lubricant therefrom, will coincidentally effect an impelling rotational movement of the impeller 19.

Also, that this rotational movement of the impeller will effect compression on the body of grease disposed intermediate the impeller and the cylinder 2, and will compact the body of grease to exclude air and to prevent the formation of an air channel in the form of a funnel, or otherwise, through the body of grease, when the piston 3 is subsequently withdrawn by the compression spring 34, interposed between the hand grip 8 affixed to the rod 10, and the cap 12, to effect a reduction in pressure below atmospheric pressure, of the air in the cylinder 2, to effect a draught of a new supply of lubricant into the cylinder, past the piston 3.

Also, moreover, rotational movement of the impeller will very substantially reduce the retarding effects of adhesion between the body of grease in the reservoir and the reservoir walls, which otherwise, upon such a reduction in pressure in the cylinder, would tend to effect an air channel usually in the form of a funnel longitudinally through the body of grease, leading to the cylinder 2.

Also, that upon an approach to completion of lubricant in the reservoir the remaining grease will be piled up in the form of a cone or otherwise on the dispensing end portion of the reservoir over the mouth 1, leading to the cylinder 2.

Referring now to the embodiment of my invention illustrated by parts thereof in Figs. 8 and 9, this embodiment differs only from the embodiment as above described in that it illustrates another form of impeller, wherein the impeller 19' is not inclined to a plane passing through the axis of its shaft 20' but is always in such a plane in all rotative movements about the rod 10. Also, I preferably provide the blade 19' with an enlarged aperture 35 in its upper intermediate portion.

In such an embodiment the body of grease would be swept from the lateral walls of the reservoir by the portion 36 of the blade, and be moved inwardly along the forward wall of the impeller towards its shaft by the body portion 37 of the blade. The lubricant swept from the lateral walls of the reservoir will be compacted and piled up above the mouth 1 of the inlet passage leading to the cylinder 2, even upon conditions of partial depletion of lubricant in the reservoir. Impellers of this kind would compact the lubricant, expressing air and preventing the forming of air bubbles or air passages therein, by laterally directing compacting pressure on the lubricant, and laterally moving the body of lubricant inwardly.

In the operation of the impeller, such as that shown in either of the embodiments described, I preferably so form the blades for the embodiments illustrated, so that no portion of such blades will displace lubricant from the space between the ends 38 and 38', respectively, for the blades 19 and 19', and the mouth 11 of the conduit. This is accomplished by cutting away the blade as at 39, between the portion 38' and the rod 10, as illustrated in connection with the said second embodiment.

Lubricant will, therefore, remain contiguous to the inlet mouth of the conduit leading to the pressure cylinder which will be replenished with lubricant upon each movement of the piston to displace lubricant from the cylinder.

Although the embodiment impellers illustrated and described are provided each with but a single blade, I contemplate sometimes making these with a plurality of angularly divergent blades, which may be of the same or of varying forms. I also contemplate the provision of a plurality of impeller elements longitudinally disposed each to the other.

Although, also, I have illustrated the ratcheting elements as comprising parts relatively so disposed that the impeller will be advanced upon a lubricant ejecting movement of the piston rod, I contemplate, within the scope thereof, the reverse arrangement, wherein, the impeller will be advanced by a ratchet operation upon a retractive movement of the piston rod.

Having thus described my invention in certain embodiments, I am aware that numerous and extensive departures may be made from the embodiments herein illustrated and described, but without departing from the spirit of my invention.

I claim:

1. In a grease gun, the combination with a compression cylinder, a piston reciprocable therein, a reservoir for supplying lubricant thereto, a rotary impeller movable in the reservoir directly compacting the body of grease therein, a dispensing nozzle for the gun, a handle for the gun, and means responsive to relative longitudinal movements of said handle and nozzle to move said impeller.

2. In a grease gun, the combination with a grease reservoir, a rotary impeller movable about the axis of the reservoir to directly compact the body of grease therein, a handle and a dispensing nozzle, and means responsive to relative longitudinal movements of said handle and nozzle to circuitously move said impeller to sweep grease from the lateral walls of the reservoir.

3. In a portable hand operated grease gun, the combination with a compression chamber, a compressor element therefor, means for operating said compressor element, a tubular lubricant reservoir having substantially cylindrical side walls in communication with said chamber, a rod extending axially of the reservoir, an impeller having an edge disposed adjacent to said side walls on said rod, and means responsive to actuation of said compressor element operating means to rotate the impeller on the rod.

4. In a portable hand operated grease gun, a compressor, operating means therefor, a lubricant reservoir having substantially cylindrical side walls, a rod extending axially thereof, an impeller having an edge extending longitudinally along said side walls, journaled on the rod, and means responsive to actuation of the compressor to rotate the impeller about said rod.

5. In a grease gun, a compressor, a lubricant reservoir for supplying lubricant from an end wall aperture thereto, a rod extending axially through the reservoir and said aperture, adapted to be longitudinally reciprocated relative to the reservoir, to operate the compressor, an impeller on the reservoir movable in an annular path coaxial with said rod, and means responsive to a longitudinal movement of the rod to advance the impeller.

6. In a grease gun, a compressor, a lubricant reservoir for supplying lubricant thereto, a rod extending axially through both end walls of the reservoir adapted to operate the compressor, said compressor disposed at an end of the reservoir and supported thereby, a handle on the rod disposed exteriorly of the other end of the reservoir, an impeller blade having outer edges disposed contiguously to lateral walls of the reservoir, said blade journaled on said rod, and means responsive to longitudinal thrusts exerted on said rod by said handle to operate the compressor, and means responsive thereto to move the impeller circuitously along said lateral walls.

7. In a grease gun, a compressor, operating means therefor, a lubricant reservoir, a rod extending axially thereof, an impeller journaled on the rod, and means responsive to actuation of the compressor to rotate the impeller about said rod, and said means comprising ratchet mechanism, whereby reciprocatory movements of the rod relative to the impeller effect successive movements of the impeller in the same circuitous direction.

8. In a grease gun, a compressor, a lubricant reservoir, a rod disposed axially therein, an impeller journaled on the rod, said rod longitudinally reciprocable to actuate the compressor, and means responsive to a longitudinal movement of the rod to circuitously move the impeller around the rod.

9. In a grease gun, a compressor, a lubricant reservoir, a rod disposed axially therein, an impeller journaled on the rod, said rod longitudinally reciprocable to actuate the compressor, and means responsive to a longitudinal movement of the rod to circuitously move the impeller around the rod, said means comprising a pair of cooperative camming elements, one for the rod and one for the impeller, and a ratcheting mechanism.

10. In a grease gun, a compressor, a lubricant reservoir for supplying lubricant thereto, a rod extending axially through the reservoir adapted to operate the compressor, a handle disposed exteriorly of the compressor on the rod, an impeller blade having outer edges disposed contiguously to lateral walls of the reservoir journaled on said rod, and means responsive to longitudinal thrusts exerted on said rod by said handle, to move the impeller circuitously along said lateral walls, comprising an annulus journaled on the rod, a pair of cooperative cam elements of said annulus and said rod adapted to effect relative rotation of the annulus to the rod upon relative longitudinal movements thereof, and a ratcheting mechanism comprising interengaging ratchet elements of said impeller and said annulus.

11. In a grease gun, the combination with a compressor, a reservoir for supplying lubricant thereto, after actuations thereof, an operating rod for the compressor extending axially through the reservoir, an impeller comprising a tube journaled on the rod and a blade extending laterally from the tube within the reservoir, an annulus journaled on the rod, and a pair of cooperative cam elements for said annulus and rod to effect rotation of the annulus responsive to a longitudinal movement of the rod, said annulus and tube having interengaging ratcheting elements formed at contiguous ends thereof.

12. In a grease gun, the combination with a compressor, a reservoir for supplying lubricant thereto, after actuations thereof, an operating rod for the compressor extending axially through the reservoir, an impeller comprising a tube journaled on the rod and a blade extending laterally from the tube within the reservoir, an annulus journaled on the rod, a pair of cooperative cam elements for said annulus and rod to effect rotation of the annulus responsive to a longitudinal movement of the rod, said annulus and tube having interengaging ratcheting elements formed at contiguous ends thereof, and spring means for retracting said operating rod, and for yieldingly holding the said ratcheting elements in engagement.

In testimony whereof I hereunto affix my signature this 19th day of October, 1929.

OSCAR U. ZERK.